United States Patent
Lei et al.

(10) Patent No.: US 11,812,355 B2
(45) Date of Patent: Nov. 7, 2023

(54) DRONE-BASED VEHICLE CONNECTIVITY SYSTEMS AND METHODS

(71) Applicant: Ford Global Technologies, LLC, Dearborn, MI (US)

(72) Inventors: Oliver Lei, Windsor (CA); Vladyslav Slyusar, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/323,776

(22) Filed: May 18, 2021

(65) Prior Publication Data

US 2022/0377519 A1    Nov. 24, 2022

(51) Int. Cl.
| | |
|---|---|
| H04W 4/90 | (2018.01) |
| H04W 76/50 | (2018.01) |
| H04W 4/70 | (2018.01) |
| H04W 4/029 | (2018.01) |
| H04L 29/08 | (2006.01) |
| B64C 39/02 | (2023.01) |
| H04L 67/12 | (2022.01) |
| B64U 101/20 | (2023.01) |

(52) U.S. Cl.
CPC ............ *H04W 4/90* (2018.02); *B64C 39/024* (2013.01); *H04L 67/12* (2013.01); *H04W 4/029* (2018.02); *H04W 4/70* (2018.02); *H04W 76/50* (2018.02); *B64U 2101/20* (2023.01)

(58) Field of Classification Search
CPC ......... H04W 4/90; H04W 4/029; H04W 4/70; H04W 76/50; B64C 39/024; B64C 2201/122; H04L 67/12
See application file for complete search history.

(56) References Cited

U.S. PATENT DOCUMENTS

| | | | |
|---|---|---|---|
| 6,532,360 B1 * | 3/2003 | Shaffer | G08B 25/016 455/404.1 |
| 10,642,279 B2 | 5/2020 | Lockwood et al. | |
| 2002/0123833 A1 * | 9/2002 | Sakurai | H04W 24/00 701/31.4 |
| 2016/0204978 A1 * | 7/2016 | Anderson | H04W 76/19 370/225 |
| 2017/0139421 A1 * | 5/2017 | Lockwood | G05D 1/0276 |
| 2018/0099678 A1 | 4/2018 | Absmeier et al. | |
| 2018/0375567 A1 | 12/2018 | Fan et al. | |

(Continued)

FOREIGN PATENT DOCUMENTS

DE    102015207979 A1    11/2016

OTHER PUBLICATIONS

Wang et al. "VDNET: An Infrastructure-Less UAV-Assisted Sparse Vanet System With Vehicle Location Prediction" (Sep. 2016).

(Continued)

*Primary Examiner* — Minjung Kim
(74) *Attorney, Agent, or Firm* — Brandon Hicks; Eversheds Sutherland (US) LLP

(57) ABSTRACT

Drone-based vehicle connectivity systems and methods are disclosed herein. A method can include determining a loss of network connectivity by any of a vehicle and/or a drone associated with the vehicle, receiving an emergency message from the vehicle, launching the drone to navigate to a location where network connectivity exists, and transmitting the emergency message to a service provider when a connection to a network is established.

15 Claims, 3 Drawing Sheets

(56) References Cited

U.S. PATENT DOCUMENTS

| | | | |
|---|---|---|---|
| 2019/0178659 A1* | 6/2019 | DeLuca | G01C 21/3453 |
| 2020/0084639 A1* | 3/2020 | Carpenter | G08G 5/0056 |
| 2020/0096594 A1* | 3/2020 | Virtej | G08G 5/0008 |
| 2020/0174477 A1 | 6/2020 | Li | |
| 2021/0241632 A1* | 8/2021 | Mustafic | H04W 48/04 |
| 2022/0033077 A1* | 2/2022 | Myslinski | G06T 7/20 |

OTHER PUBLICATIONS

Sedin et al. "Drones and Networks: Mobility Support" (Jan. 2019).

* cited by examiner

DRONE-BASED VEHICLE CONNECTIVITY SYSTEMS AND METHODS

BACKGROUND

A vehicle operating in a rural or mountainous area can encounter problems when attempting to communicate remotely over a distance, even if the vehicle is equipped with a telematic control unit (TCU) and roof-mounted antenna. The TCU may not be able to maintain cellular connectivity due to sporadic and fringe radio frequency (RF) coverage in that area.

As a result, a user of the vehicle cannot use remote services (such as an emergency call in order to exchange data with a backend server/service provider). Sometimes, this lack of communication can be critical, for example, if the vehicle and/or user have been in an accident or there are severe weather conditions around the vehicle, such as the vehicle being stuck in mud or snow.

BRIEF DESCRIPTION OF THE DRAWINGS

The detailed description is set forth regarding the accompanying drawings. The use of the same reference numerals may indicate similar or, identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

The present disclosure generally pertains to drone-based vehicle connectivity systems and methods. For example, an unmanned aerial vehicle (e.g., drone or UAV) can be used as a cellular signal extender for a vehicle. In some instances, the vehicle may be operating in a remote area where connectivity may be poor or non-existent. The vehicle may launch the drone to, fly around (higher, wide area, etc.) by autonomous activity or controlled by a user. The drone can travel to a location where it can connect to a cellular network and establish a connection. The drone bridges a cellular connection to the vehicle via a C-V2X (cellular vehicle-to-everything) module. Thus, the vehicle can use cellular service even when the vehicle's C-V2X module is unable to connect to the cellular network directly. The drone may also be used to communicate emergency messages.

In an example use case, a vehicle may become stuck in the snow and unable to connect to a cellular network to make an emergency call. An emergency message can be provided to a drone and the drone may be launched from the vehicle. The drone may take a snapshot of the vehicle and/or capture the vehicle's GPS location to include along with the emergency message. The drone may fly to an area with cellular coverage to send the information. The drone may be launched from the vehicle using the HMI (human-machine interface) of the vehicle or can be launched based on a triggering condition, such as CAN (controller area network) data from the vehicle.

In another example use case, when network connectivity is lost or is unstable (e.g., jitter, latency, etc.) and a vehicle is disabled, a connected drone can be launched to a spot where the drone can make a cellular connection. Then the drone can make a connection to the vehicle and create a network bridge between the vehicle and a base station or access point or other similar wireless interfaces to a fronthaul and/or backhaul communications network. If the drone is out of the range with respect to the vehicle the drone can also send emergency messages for the vehicle.

ILLUSTRATIVE EMBODIMENTS

Figure 1:
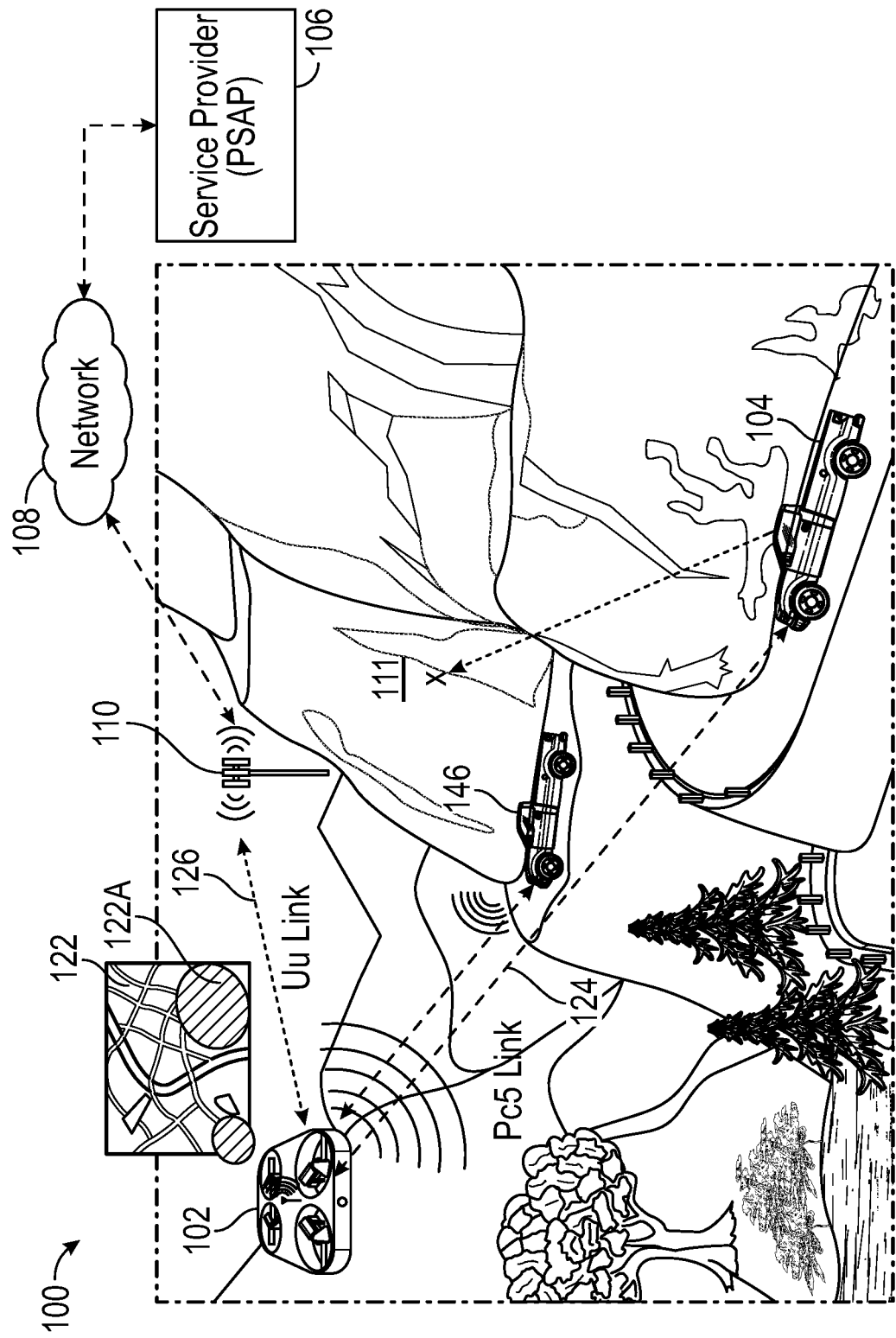
FIG. 1 illustrates an example architecture where the systems and method of the present disclosure may be practiced.
Figure 2:
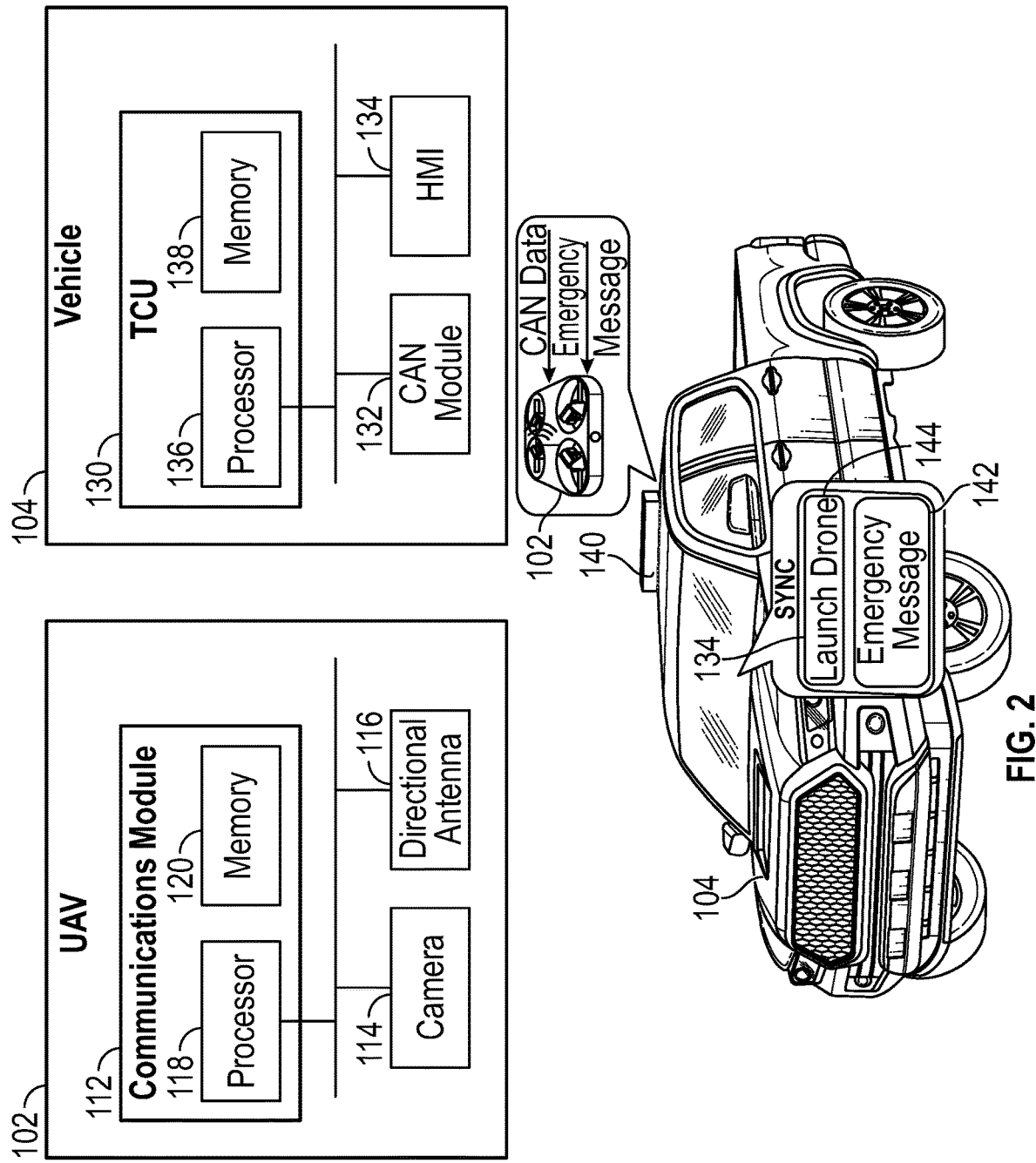
FIG. 2 illustrates schematic diagrams of both a drone and vehicle, as well as a perspective view of a human-machine interface of the vehicle and the drone.

Turning now to the drawings, FIGS. 1 and 2 collectively depict an illustrative architecture 100 in which techniques and structures of the present disclosure may be implemented. The architecture 100 can include a UAV 102 (may be interchangeably referred to as a drone, a vehicle 104, a service provider 106 (such as a public service answering point (PSAP)), and a network 108 comprising a wireless interface such as a base station 110. Some or all of these components in the architecture 100 can communicate with one another using the network 108. The network 108 can include combinations of networks that enable the components in the architecture 100 to communicate with one another. The network 108 may include any one or a combination of multiple different types of networks, such as cellular, cable, the Internet, wireless networks, and other private and/or public networks. In some instances, the network 108 may include Wi-Fi or Wi-Fi direct.

For context, due to the terrain 111 or distance between the vehicle 104 and the base station 110 of the network 108, the vehicle 104 may lose network connectivity with the base station 110. It will be understood that while a base station 110 is described, other wireless interfaces that can be used to access the network 108 can be utilized. Thus, the UAV 102 can be adapted to connect with various types of network endpoints, access points, and the like. In normal operating conditions, this loss of network connectivity may be sporadic or temporary and connectivity may be reestablished as the vehicle enters communication range with the base station 110. However, if or when the vehicle 104 is disabled due to a health emergency with the driver, an accident, a mechanical failure, loss of fuel, and/or other similar situations and the vehicle 104 is without network connectivity, this may cause a situation where vehicle occupants require assistance. The combination of vehicle or driver disability and lack of network connectivity may be referred to herein as a triggering event. When a triggering event occurs, the UAV 102 can be launched to establish a network bridge with the base station 110 and/or relay emergency messages from the vehicle 104 or driver of the vehicle 104.

In more detail, UAV 102 can comprise a communications module 112, a camera 114, and a directional antenna or multiple directional antennas 116. The communications module 112 can comprise a processor 118 and memory 120. The processor 118 can be configured to execute instructions stored in memory 120. In some examples, the instructions are executed to perform any of the methods disclosed herein. When referring to operations performed by the UAV 102, it will be understood that this includes the execution of instructions stored in memory 120 by the processor 118.

In one example, the UAV communications module 112 includes a cellular-to-vehicle-to-everything (C-V2X or equivalent) module that allows the UAV 102 to communicate with the base station 110 and the vehicle 104. In some instances, the UAV 102 steers the directional antenna 116 to improve signal strength between the UAV 102 and the base station 110. As noted above, although a single antenna is illustrated, multiple direction antennas may be used herein.

In some instances, the UAV 102 can be associated with the vehicle 104. The UAV 102 can be stored in a compartment in the vehicle 104, as will be discussed in greater detail infra. Thus, the vehicle 104 and UAV 102 travel together as the vehicle 104 is driven by an operator (the vehicle could be fully or partially autonomously operated as well). As the vehicle 104 is driven, the UAV communications module 112 can be configured to track cellular network parameters such as cellular network connection spot data. That is, the UAV communications module 112 may collect data such as GPS coordinates and RF values such as a signal strength RSSI (Received Signal Strength Indicator)/RSRP (Reference Signal Received Power), although other measurements of signal strength can also be used. The UAV communications module 112 can also track and record the location of the UAV 102 in real-time or near-real-time. In sum, the UAV 102 can track cellular connection data as the vehicle is driven or search, a coverage map 122 stored in memory 120 on the drone to identify a location where connectivity to the base station 110 is likely to be available. The coverage map 122 can include areas, such as area 122A, that are indicative of locations where connectivity should be present.

It will be understood that the signal strength can be indicative of the quality of the network connection between the UAV communications module 112 and the base station 110. The UAV communications module 112 can store these values in memory 120 for later use, such as when a triggering event occurs. The UAV communications module 112 can also store an RF coverage map that indicates where network connectivity should be present. The UAV communications module 112 can utilize its current location and navigate to a stored location or a spot on the RF coverage map when a triggering event occurs. In some instances, the UAV 102 can be manually flown by a vehicle occupant.

The UAV 102 can receive vehicle information from the vehicle 104. For example, the UAV 102 can receive vehicle information from a telematic control unit of the vehicle 104 to determined or infer when a triggering event occurs. The UAV 102 can also receive a signal from the vehicle 104 to launch and establish a network connection or bridge with the base station 110. The UAV 104 may receive one or more emergency messages from the vehicle 104 to relay to the service provider 106 once the UAV 102 has been launched and a network connection is established with the base station 110. Additional details with respect to these features are disclosed below with reference to the description of the function and operation of the vehicle 104. In general, the UAV communications module 112 can establish a PC5 (3GPP LTE-V2X) link 124 with the vehicle 104 and a Uu (between UTRAN and UE) link 126 with the base station 110. In some instances, the UAV 102 can navigate itself to the last known location where a wireless signal was detected by the UAV communications module 112. In other instances, the UAV 102 can navigate itself using the RF coverage map.

When connectivity to the base station 110 is established, the UAV 102 can create a network bridge between the vehicle 104 and the base station 110 allowing the vehicle 104 to transmit signals over the network 108 through the base station 110. The vehicle 104 can transmit emergency messages to the service provider 106, for example. Again, the UAV 102 acts as a network bridge or proxy for relaying messages from the vehicle 104 to the network 108 and vice-versa.

The UAV 102 can be adapted to steer the directional antenna 116 based on the signal strength of the link established between the UAV 102 and the base station 110. For example, the UAV communications module 112 can continually or periodically measure signal strength of the Uu link 126 and selective adjust or steer the directional antenna 116 as the signal strength varies. The UAV 102 can also move closer to the base station 110 or higher relative to the terrain if steering the directional antenna 116 does not improve the signal strength.

When the UAV 102 is launched, the camera 114 can be utilized to obtain images of the vehicle 104 and/or the terrain 111. The images may be transmitted along with an emergency message to provide an emergency responder with contextual information regarding the status of the vehicle 104. For example, the images can assist the emergency responder to dispatch the proper rescue protocols. That is, the image can indicate that medical services may be needed if the vehicle 104 has been in a wreck or if the driver is in a medical emergency. However, medical services may not be needed if the vehicle 104 is merely disabled, but has not been in an, accident. In some instances, the UAV 102 can directly message the service provider 106 such as a public service answering point (PSAP) to dispatch emergency medical services when the UAV 102 receives vehicle information that indicates that the vehicle 104 has been in an accident.

The UAV 102 and the vehicle 104 can also communicate and exchange their respective GPS locations so that the UAV 102 can fly back to the vehicle 104. In some instances, a user can instruct the UAV 102 to return to, the vehicle 104. In other instances, the UAV 102 can return to the vehicle 104 after delivering an emergency message to the base station 110 and receiving an acknowledgment from the service provider 106 that assistance has been dispatched to a location of the UAV 102 and/or vehicle 104. The UAV 102 may be out of communication range with the vehicle 104 while delivering the emergency, message and may fly back by itself to its stored vehicle location after message is delivered. In other configurations, the UAV 102 can maintain a network bridge until emergency services arrive at a location of the vehicle 104.

The vehicle 104 can include a telematic control unit (TCU 130) that can implement C-V2X or equivalent communications, a CAN module 132, and a human machine interface (HMI 134). The TCU 130 can include a processor 136 and memory 138. The processor 136 executes instructions stored in memory 138 to perform any of the methods disclosed herein related to the vehicle 104.

The TCU 130 tracks vehicle information such as vehicle GPS location, as well as provides connectivity services to the network 108. For example, the TCU 130 can connect with the base station 110. The TCU 130 can also receive information from various vehicle sub-systems such as the CAN module 132 which can gather vehicle information from various vehicle systems. Example vehicle information can include fuel status, engine status, crash or collision detection, and the like. The vehicle information may indicate that the vehicle has encountered a disabling or triggering event.

The vehicle 104 can also comprise a UAV compartment 140. The UAV 102 can launch and/or land within the UAV compartment 140. In general, as the vehicle 104 is driven, the TCU 130 can be configured to track cellular network parameters such as cellular network connection spot data. That is, the TCU 130 may collect data such as GPS coordinates and RF values such as a signal strength RSSI (Received Signal Strength Indicator)/RSRP (Reference Signal Received Power), although other measurements of signal strength can also be used. The TCU 130 may also track and record the location of the vehicle 104 in real-time or near-real-time. When a loss of connectivity is determined by the TCU 130, and/or a triggering event has been determined. It will be understood that the UAV 102 need not be stored in the UAV compartment 140 but may reside within the vehicle 104.

A user can compose an emergency message 142 using the HMI 134. The emergency message can include any combination of text, audio, and/or video. The emergency message 142 can be stored at the UAV 102 in memory 120. In some instances, the message is transmitted to the UAV 102 and stored before launching the UAV 102. The HMI 134 can also include a button 144 to launch the UAV 102. As noted above, the UAV 102 can be automatically launched upon the occurrence of a triggering event. For example, any event where the vehicle 104 is disabled (determined using CAN module 132 data) and network connectivity are deficient (determined by the TCU 130), the UAV 102 can be automatically launched to create a network bridge and/or deliver an emergency message. To be sure, the emergency message can be a pre generated message that indicates that the vehicle and/or driver have experienced an emergency.

In one use case such as a severe collision (e.g., airbag deployed), a vehicle TCU roof-mounted antenna may be damaged and may not work properly. In this case, the UAV 102 can be ejected automatically (triggered by the event), fly to a RF coverage area to send the emergency message to the service provider 106. In some instances, the UAV 102 can be automatically launched when a triggering event has occurred, without regard to a status of the network connectivity of the communications module (e.g., TCU 130) of the vehicle 104.

In some instances, the UAV 102 can be configured to fly to a nearest RF coverage spot. If the nearest RF coverage spot is too far based on the tracking data, the UAV 102 can divert to a nearby town based on a map stored in memory 120. Thus, the UAV 102 can intelligently select a connectivity spot based on a ruleset.

In some instances, if a second vehicle 146 is located in communication distance to the UAV 102, the UAV 102 can relay the emergency message to the second vehicle 146. The second vehicle 146 may relay the emergency message to the base station 110 (when connectivity to the base station is available). The second vehicle 146 may also relay the message to another vehicle that may then relay the message to the base station 110. Thus, the emergency message can be relayed in a daisy-chain manner or through a series of connected vehicles in a mesh or ad-hoc network.

Figure 3:
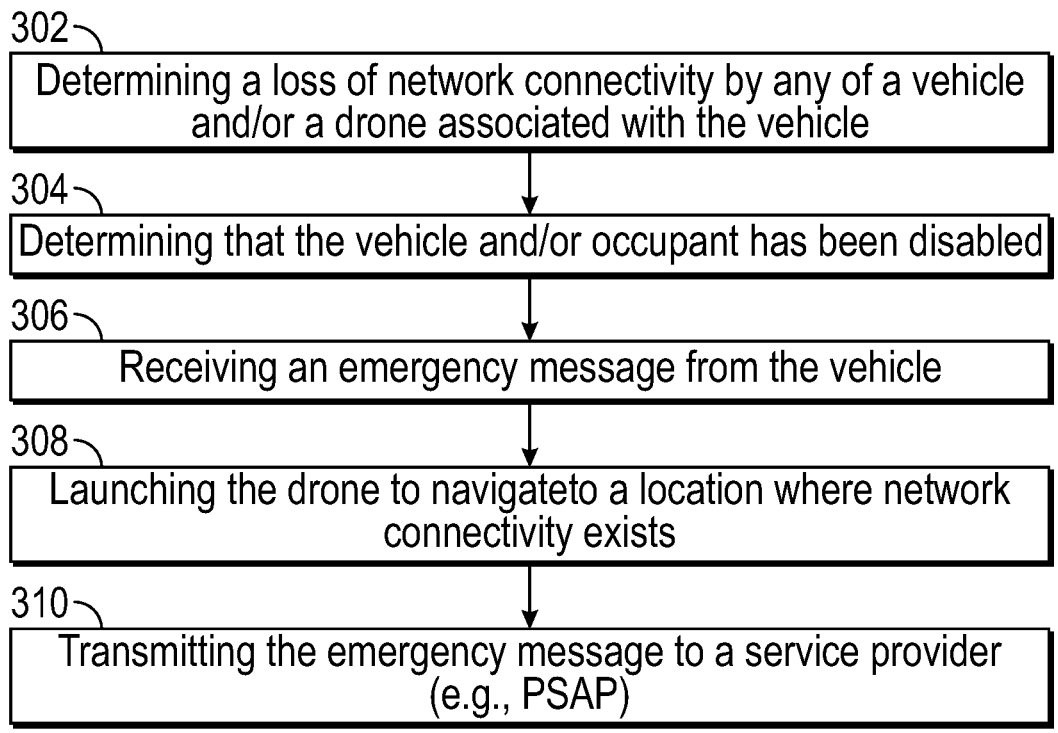
FIG. 3 is a flowchart of an example method of the present disclosure.

FIG. 3 is a flowchart of an example method of the present disclosure. The method can include a step 302 of determining a loss of network connectivity by any of a vehicle and/or a drone associated with the vehicle. That is, the TCU of the vehicle or the communications module of the UAV may either or both determine that they do not have network connectivity. The loss of communications can be based on the signal strength and/or quality of connection in some instances. For example, the UAV can be launched when a signal strength is below a threshold value. Thus, total loss of connectivity is not mandatory and the UAV can be launched to relay messages and/or create a network bridge when signal strength is below a threshold value.

The method can also include a step 304 of determining that the vehicle and/or occupant has been disabled. For example, CAN module signals may indicate that the vehicle is stuck or has been in an accident.

In some instances, the method can include a step 306 of receiving an emergency message from the vehicle. The message can be pre-transmitted to the UAV before the vehicle becomes disabled. In another example, a user can create an emergency message through the HMI of the vehicle (or another similar vehicle system such as a voice recognition system). The UAV can be launched. Next, the method includes a step 308 of navigating the drone to a location where network connectivity exists. Again, the UAV can navigate itself using stored information such as tracked GPS connectivity spots and/or an RF coverage map. Again, network connectivity can be determined by tracking cellular connection data as the vehicle is driven. This cellular connection data can be tracked by the TCU of the vehicle and/or the communications module of the UAV. Tracking can include identifying network connection spots by location (GPS) and signal strength.

Once connectivity has been established between the UAV and the network, the method can include a step 310 of transmitting the emergency message to a service provider (e.g., PSAP). The method can also include creating a network bridge between the vehicle and the network, allowing the UAV to act as a bridge, gateway, or proxy to the network.

The method can include determining network connectivity with another vehicle and transmitting the emergency message by the drone to the other vehicle. The other vehicle can be configured to relay the emergency message to one or more additional vehicles or the service provider.

The method can include a step of selectively adjusting a directionality of an antenna of the drone to maximize a signal strength of the connection. In some instances, the UACV can be configured to obtain an image of the vehicle by the drone and transmit the image along with the emergency message to the service provider.

Figure 4:
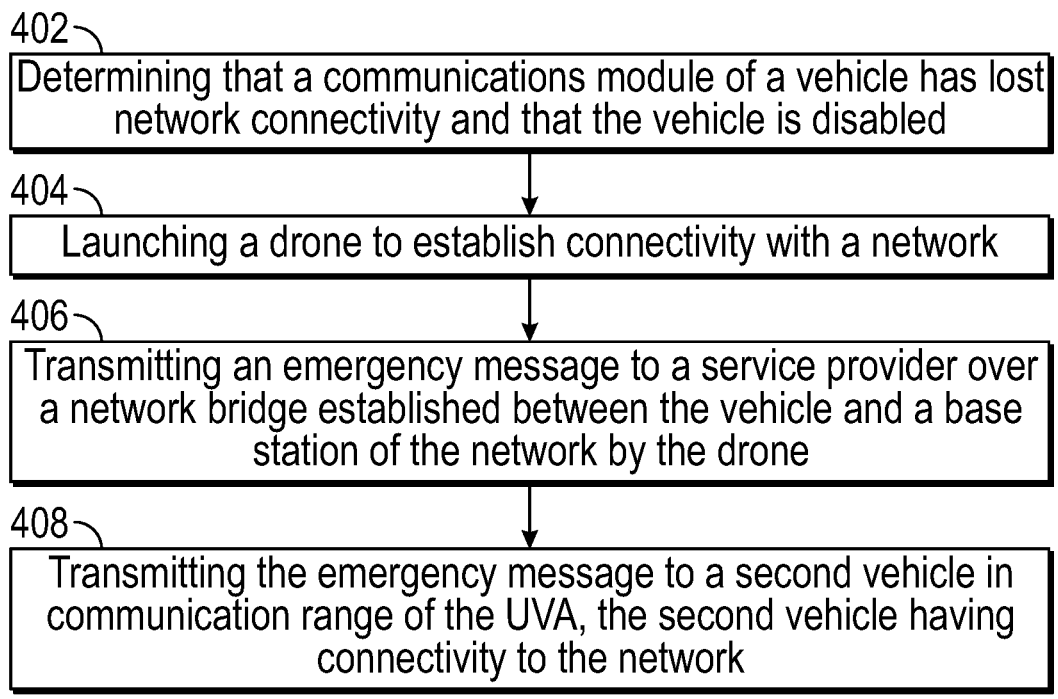
FIG. 4 is a flowchart of another example method of the present disclosure.

FIG. 4 is a flowchart of an example method of the present disclosure. The method can include a step 402 of determining that a communications module of a vehicle has lost network connectivity and that the vehicle is disabled. This combination of factors may be referred to as a triggering event (e.g., loss of connectivity plus vehicle or driver disability).

Next, the method can include a step 404 of launching a drone to establish connectivity with a network. It will be understood that the drone navigates itself to a location where connectivity is available. The method further includes a step 406 of transmitting an emergency message to a service provider over a network bridge established between the vehicle and a base station of the network by the drone. This can include transmitting an emergency message directly from the vehicle to the network, but through the network bridge established by the UAV. If the UAV is out of the range to communicate with the vehicle, the UAV may simply deliver the emergency message to the service provider.

The method can also include a step 408 of transmitting the emergency message to a second vehicle in communication range of the UAV. If the second vehicle has connectivity with the network, the second vehicle can relay the emergency message to the network.

In some instances, the method can include determining a triggering event where an antenna of the vehicle is damaged, as well as, automatically launching the drone when the triggering event has occurred. Again, the automatic launching of the drone can occur without regard to a status of the network connectivity of the communications module (e.g., TCU) of the vehicle.

The method can include a step of generating the emergency message, where the emergency message includes any one or more of text, audio, and/or video, in combination with vehicle information and vehicle location. Again, the vehicle information can include CAN module data that is indicative of vehicle or vehicle component operational status.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could." "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method comprising:
   determining, by a vehicle and/or a drone associated with the vehicle, that a triggering event has occurred, the triggering event including a loss of network connectivity of the vehicle and an emergency situation involving the vehicle and/or an occupant of the vehicle, the loss of connectivity including damage to a first antenna of the vehicle, the emergency situation including at least one of a health emergency of the occupant and a disablement of the vehicle, and the disablement of the vehicle associated with an accident involving the vehicle, a mechanical failure of the vehicle, or a loss of fuel of the vehicle;
   creating, by the vehicle and/or the drone and based on the triggering event occurring, an emergency message indicative of the emergency situation;
   automatically and autonomously launching, based on the triggering event occurring, the drone to navigate to a location where network connectivity exists and creating a network bridge for the vehicle, wherein the drone maintains a network bridge until emergency services arrive at a location of the vehicle;
   transmitting, when a connection to a network is established by the drone, the emergency message to a service provider; and
   determining network connectivity of the drone with another vehicle and transmitting the emergency message by the drone to the another vehicle, the another vehicle being a ground vehicle configured to relay the emergency message to one or more additional vehicles or to the service provider.

2. The method according to claim 1, further comprising identifying, with a telematic control unit of the vehicle, the location where network connectivity exists by tracking cellular connection data of the vehicle as the vehicle is driven or searching a coverage map stored in memory on the drone.

3. The method according to claim 2, wherein tracking the cellular connection data includes identifying network connection spots by location and signal strength.

4. The method according to claim 1, further comprising selectively adjusting a directionality of a second antenna of the drone to maximize a signal strength of the connection to the network.

5. The method according to claim 1, further comprising obtaining an image of the vehicle by the drone and transmitting the image along with the emergency message to the service provider.

6. The method according to claim 5, further comprising obtaining vehicle information associated with the vehicle by the drone and transmitting the vehicle information along with the emergency message to the service provider.

7. The method according to claim 1, wherein said drone is automatically and autonomously launched from a compartment of said vehicle.

8. A drone comprising:
   a communications module;
   a processor; and
   a memory for storing instructions, the processor executing the instructions to:
      determine an occurrence of a triggering event, the triggering event including a loss of network connectivity by a vehicle and/or the drone and an emergency situation involving the vehicle and/or a user of the vehicle, the emergency situation including at least one of a health emergency of the user and a disablement of the vehicle, and the disablement of the vehicle associated with an accident involving the vehicle, a mechanical failure of the vehicle, or a loss of fuel of the vehicle;

receive vehicle information from the vehicle, the vehicle information comprising any one or more of text, audio, and/or video;

generate an emergency message indicative of the emergency situation, the emergency message comprising the vehicle information and a vehicle location;

autonomously launch and navigate, by the drone, to a location where network connectivity exists and creating a network bridge for the vehicle, wherein the drone maintains a network bridge until emergency services arrive at a location of the vehicle;

transmit, by the drone, the emergency message to a service provider when the communications module establishes a connection to a network; and determine network connectivity of the drone with another vehicle and transmit the emergency message to the another vehicle, the another vehicle being a ground vehicle configured to relay the emergency message to one or more additional vehicles or to the service provider.

9. The drone according to claim 8, wherein the processor is configured to:

establish a network bridge between a vehicle communications module of the vehicle and a base station of the network; and selectively adjust a directionality of an antenna to maximize a signal strength of the connection or utilize a plurality of antennas.

10. The drone according to claim 8, wherein the processor is configured to:

obtain an image of the vehicle and vehicle information associated with the vehicle; and transmit the image and the vehicle information along with the emergency message to the service provider.

11. A method comprising:

determining that a triggering event has occurred, the triggering event including a loss of network connectivity of a communications module of a vehicle and an occurrence of an emergency situation involving the vehicle and/or a user of the vehicle, the loss of connectivity including damage to an antenna of the vehicle, the emergency situation including at least one of a health emergency of the user and a disablement of the vehicle, and the disablement of the vehicle associated with an accident involving the vehicle, a mechanical failure of the vehicle, or a loss of fuel of the vehicle;

receiving user input through a human machine interface (HMI) of the vehicle, the user input comprising any one or more of text, audio, and/or video;

generating an emergency message indicative of the emergency situation, the emergency message comprising the user input in combination with vehicle information and vehicle location;

automatically and autonomously launching, based on the triggering event occurring, a drone to establish connectivity with a network, the drone navigating to a location where connectivity with the network is available and creating a network bridge for the vehicle, wherein the drone maintains a network bridge until emergency services arrive at a location of the vehicle;

transmitting, by the drone, the emergency message to a service provider; and determining network connectivity of the drone with another vehicle and transmitting the emergency message by the drone to the another vehicle, the another vehicle being a ground vehicle configured to relay the emergency message to one or more additional vehicles or to the service provider.

12. The method according to claim 11, further comprising tracking, with a telematic control unit of the vehicle, cellular connection data of the vehicle as the vehicle is driven and identifying network connection spots by location and signal strength.

13. The method according to claim 11, further comprising transmitting controller area network data of the vehicle to the drone for forwarding to the service provider.

14. The method of claim 11, further comprising automatically launching the drone based on receiving a second user input to the HMI.

15. The method according to claim 11, wherein said drone is automatically and autonomously launched from a compartment of said vehicle.

* * * * *